Dec. 7, 1937.  J. P. TARBOX  2,101,108
WELD EFFICIENCY INDICATOR
Filed May 13, 1932
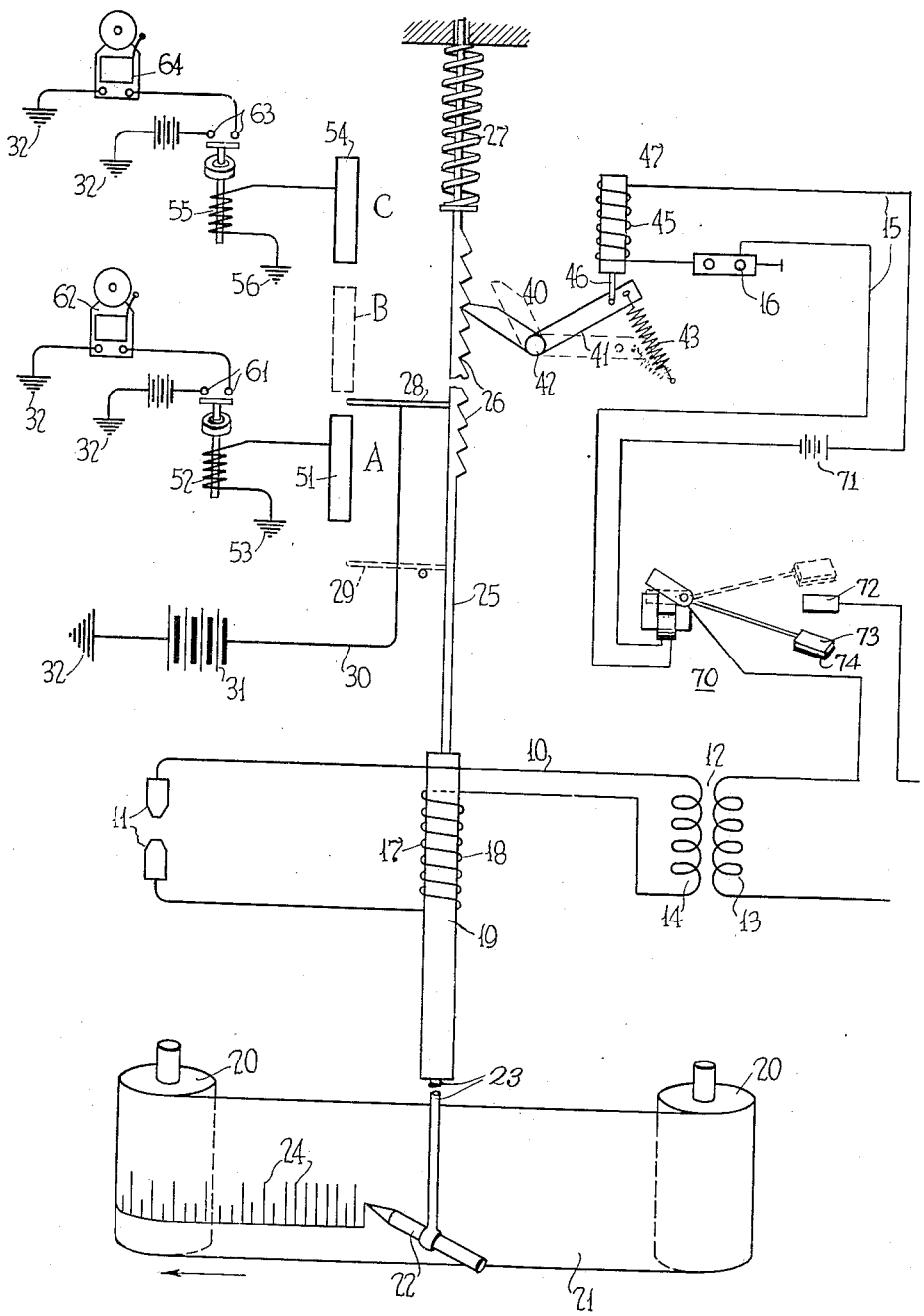
INVENTOR Patented Dec. 7, 1937

2,101,108

UNITED STATES PATENT OFFICE 2,101,108

WELD EFFICIENCY INDICATOR

John P. Tarbox, Philadelphia, Pa., assignor to Edward G. Budd Manufacturing Company, Philadelphia, Pa., a corporation of Pennsylvania Application May 13, 1932, Serial No. 611,223

5 Claims. (Cl. 177—311)

This invention relates to welding and more particularly to comparative welding indicators. This invention has for its principal object the construction of a means suitable for giving comparative indications of the efficiency of the weld at the time of the making of such weld in the manufacturing processes.

Another object of the invention is to construct such a device adaptable for use in ordinary spot welding and of special value in the spot welding of stainless steels, wherein the duration of the weld is of extremely relatively short time, commensurately with relatively great values of current.

I attain the above enumerated desirable objects and others incidental thereto, by a weld efficiency indicator comprising a means responsive to the energy condition of a spot welding circuit and means adapted to co-operate therewith and to indicate the condition of the weld.

My invention will be better understood from the following description when considered in connection with the accompanying drawing and its scope will be pointed out in the appended claims.

Referring to the drawing, attached hereto and made a part hereof, I have shown schematically and in places partly in perspective, a mechanism constructed in accordance with this invention. The various parts are not drawn to scale and are broken at places to represent interconnecting parts.

The spot welding circuit 10 includes the transformer 12, which is the immediate source of energy for the electrodes 11 comprising primary and secondary windings 13 and 14, respectively. The primary is connected to a suitable source of power not shown, through a suitable electro magnetically operated, momentary-contact switch 70 of a type operable to effect a single momentary circuit closure upon each energization and de-energization, as through engagement of a stationary contact 72 by a wiping contact 73 insulated at 74 on one surface, and set at an angle to its path of travel so as to slide along the under surface of the stationary contact in electrical contact therewith on the up stroke, and to slide over the stationary contact with its insulated side in contact therewith on the down stroke. The circuit closing device is operated, for example, by means of remote control from the circuit 15, including the push-button station 16, a source of current 71 and the actuating magnet of the switch 70. The operation of the push-button station 16 to close the current, therefore causes the welding circuit to be momentarily energized and the welding operation to take place.

Associated with the welding circuit 10 is a means 17 adapted to act in response to the weld energy flowing in the circuit, and to transmit the action thereof to the other operating parts of the device creating suitable comparative indicia for indicating the weld efficiency or heat units value. The weld may be incomplete because the welding current is insufficient or the welding current may be too great and a burn may occur, the mechanism thus serving as a criterion of comparative values. The intermediate ground between these two comparative indications, is the area wherein a good weld has occurred. The means 17 as shown, comprises a solenoid 18 and armature 19 arranged in magnetic co-operation. Obviously, although this solenoid is shown as having a relatively large number of turns, this is entirely dependent upon the relative values of the force reuired to operate the various parts, possibly a single conductor without any turns under some circumstances would be sufficient.

As a means for visual comparative observation of the suitability and efficiency of the various welds, a mechanism comprising a plurality of step-by-step operated cylinders carrying a recording tape 21 is used. To indicate the energy value of the spot welding circuit, the motion of the armature 19 is transmitted to a recording means 22 through any suitable interlinkage 23. This visual record comprises a plurality of spaced indicia 24 as shown. The part of the mechanism just described is merely for a visual record and may comprise any other means suitable for such a purpose, it being incidental to the other parts of the device. The present invention is primarily adapted for the best psychological effect for the machine operator so that he does not have to look up from the work.

The armature 19 is connected by linkage mechanism 25 to a ratchet 26, the mechanism acting in opposition to a compression spring or other biasing element 27. In secured relation to the ratchet is a contact arm 28 which is adapted to normally rest in inactive position as at 29. This contact arm has an energizing circuit 30 connected to a source of energy shown as a battery 31, one side of which is grounded or connected to a return circuit as at 32. Upon the operation of the spot welding circuit the mechanism 17 operates to raise the ratchet arm in a vertical direction in accordance with the energy of the weld. In the spot welding of stainless steels, the duration of activity of the welding circuit is very short, possibly in the nature of one hundredth of a second so that the motion of the mechanism would be insufficient to proper use.

To adapt the mechanism to this situation, I have shown a pawl mechanism 40 comprising the pawl 41 of bell-crank shape pivotally mounted at 42 and moved to and retained in inoperative position by means of a spring 43. This spring is strong enough to return the pawl to its inoperative position in which it does not engage the ratchet 26 whenever magnet 45 is de-energized. Connected at one end of the pawl is an armature 44 positioned interiorly of a suitable solenoid 45 and connected to the pawl by a linkage 46. The solenoid 45 is energized in the control circuit 15 due to the operation of the push-button station 16 and inasmuch as it continues to be energized so long as this station is in operation the ratchet will be retained in its extreme actuated position. The operation of the push-button station due to the limitation in speed of human muscular response will in itself be of such a time duration as to be relatively large commensurately in respect to the duration of the welding operation.

Due to the actuation of the device 17, the arm 28 moves from its normal position 29 through zones A, B, and C, corresponding respectively to a zone of insufficient or defective welding, a zone of good welding and a zone of overwelding or burning. The zones A and C have co-operative therewith contacts 51 and 54. The contact 51 which would indicate a poor weld or an incomplete weld for the zone A has an indicia circuit including a delayed or retarded relay 52 and ground or return connection 53. The circuit of operation for this zone would extend from one terminal of the energy source 31 through the connection 30 to the arm 28, thence to the contact 51 through the solenoid relay 52 to the ground or return circuit 53—32. Inasmuch as the solenoid relay 52 is retarded or delayed, the operation of this relay will depend entirely upon the duration or dwell of the contact arm upon the contact. The time of this solenoid relay 52 must be commensurate with the time values of the actuation of the welding circuit control and the duration of the welding circuit operation. The solenoid relay 52 may cause a signal device to be energized either directly or indirectly as shown. The relay operation closes the signal circuit across the contacts 61 and operates a bell or other signaling means 62.

If the weld is a satisfactory weld, the pawl mechanism retains the ratchet in its actuated position somewhere in the area between the zones A and C. The contact area shown dotted is normally a dead contact, merely representing an area. If the weld is a burn, the contact arm 28 is carried into the zone C thus establishing a circuit through the contact 54 because of the actuation of the ratchet mechanism. The ratchet is again delayed or temporarily held in the actuated position by the pawl and this time if the circuit connection is continued for a duration of time such that the solenoid relay 55 operates, the contacts 63 are closed and a signal 64 is actuated.

The actuation of the push-button station is relatively of sufficient time duration so that the dwell of the contact arm 28 upon either of the contacts 51 or 54 will be sufficient to make the weld efficiency indicators 62 or 64 function, relative timing of the various parts being merely a matter of adjustment. It is obvious that if the spot welding is in connection with ordinary steel, the relative values will be appreciably greater and the adjustments of the various parts would be inherently different. The type of relays and signaling devices are subject to the substitution of equivalents, for example electrically retarded or slow-to-operate relays may be substituted for the mechanically-retarded relays, consequently apparatus made in accordance with the invention herein disclosed may in appearance be entirely dissimilar, whereas in operation be an exact duplicate.

The embodiment of the invention as illustrated and described has been selected for the purpose of clearly setting forth the principles involved. It will be apparent that the invention is susceptible of being modified to meet the different conditions encountered in its use and I therefore aim to cover by the appended claims all modifications within the true spirit and scope of the invention disclosed.

What I claim is:

1. In a weld energy consumption indicator the combination of a spot welding circuit, a control circuit operable upon energization to supply a welding impulse to the welding circuit, indicating means associated with said welding circuit and responsive to the product of a function of the current flowing therein multiplied by the time of flow, means cooperating with said responsive means retaining it temporarily in its last actuated position, and means operable upon de-energization of the control circuit to release said retaining means.

2. In a welding energy consumption indicator a spot welding circuit and means associated therewith responsive to the product of a function of the current flow therein multiplied by the time of flow, a control circuit operable upon energization to supply a welding impulse to the welding circuit, means cooperating with said responsive means and indicating individual consecutive time-current-function products, means cooperating with said energy responsive means to retain it in actuated position, and means operable upon de-energization of the control circuit to release said retaining means.

3. In a weld energy consumption indicator the combination of a spot welding circuit, a control circuit operable upon energization to supply a welding impulse to the welding circuit, indicating means including a solenoid and armature associated with said welding circuit and responsive in its degree of movement to the product of a function of the current flowing therein multiplied by the time of flow, means including a ratchet and pawl cooperating with said armature and retaining it in its position of maximum movement, and means operable upon de-energization of the control circuit to release said retaining means.

4. In a weld energy consumption indicator the combination of a spot welding circuit, a control circuit operable upon energization to supply a welding impulse to the welding circuit, a solenoid connected with said welding circuit and having an armature responsive in the extent of its movement to the product of a function of the current flowing therein multiplied by the time of flow, means for retaining said armature in actuated position, means selectively responsive to successive degrees of movement of said armature for indicating different current-time products, and means operable upon de-energization of the control circuit to release said retaining means.

5. In a welding energy consumption indicator the combination of a spot welding circuit and indicating means associated therewith responsive to the time-force product of brief energy impulses in said circuit, a control circuit operable upon energization to supply a welding impulse to the welding circuit, means arranged to retain said time-force responsive means temporarily in actuated position, and means including a slow responsive signaling device responsive only to the retention of said time-force responsive means in a given position.

JOHN P. TARBOX.